Patented Mar. 13, 1928.

1,662,439

UNITED STATES PATENT OFFICE.

CHARLES A. ROSE, OF CRANFORD, AND CHESTER L. READ, OF RAHWAY, NEW JERSEY, ASSIGNORS TO AMERICAN SMELTING AND REFINING COMPANY, OF NEW YORK, N. Y., A CORPORATION OF NEW JERSEY.

PROCESS OF PURIFYING METALLIC ANTIMONY.

No Drawing. Application filed August 24, 1926. Serial No. 131,306.

This invention relates to the treatment of metallic antimony containing impurities for the refining or purification of the metal, and more particularly relates to the separation from the impure antimony of such impurities as iron, lead, tin and other metals which may be contained therein and which deleteriously affect its properties. It further relates to the separation of the impurity metals in a form in which they may be subsequently collected and further separated among themselves whereby each metal may be converted into a useful and valuable by-product.

It is well known that antimony as recovered from its ores practically always contains impurities such as iron, tin, lead, etc., which are undesirable and which must be removed as completely as possible before the refined metal will command the best market price. This separation or refining has been found to be an expensive and difficult operation to practice, and it is seldom that the antimony can be completely purified at a reasonable cost. In particular the removal of the lead is so difficult that it is customary, when crude antimony contains much of this impurity, not to remove it at all, but to sell the impure antimony at a reduced price.

By this invention, however, is disclosed an efficient method whereby not only the iron, tin, etc., may be separated from the antimony, but also the lead may be removed as completely as may be desired. The process is simple to practice, requires no complicated or expensive apparatus and employs only a single, inexpensive reagent.

In general, the invention consists in passing through the molten impure antimony a regulated stream of chlorine gas which has been found to have the property, under these conditions, of reacting with certain of the impurity metals, such as iron, tin and lead, in preference to the antimony. It has been found further that within the operating range of temperature most, if not all of the impurity metal chlorides so formed are volatile and escape in the form of vapours which may be collected in any suitable manner and treated to recover the metals or compounds of them. The antimony remaining after the treatment is in a very pure state, as regards the above mentioned impurities, and commands the highest market price.

The invention further consists in the new and novel features of operation and the new and original arrangements and combinations of steps in the process hereinafter described and more particularly set forth in the claims.

One method by which this invenntion may be practiced is as follows: The metallic antimony which is to be purified may be melted in any suitable apparatus such, for example, as a retort or a reverberatory furnace. During the operation the temperature of the material which is undergoing the treatment is preferably maintained at a dull red heat or slightly above its melting point. As the antimony readily oxidizes at high temperature and escapes as a fume, it is preferable to carry on the operation at as low a temperature as may be practicable.

When the charge has become completely molten a tube of some inert material, for example of graphite, may be inserted into the bath so that one end of the tube projects below the surface of the molten antimony. The tube may be constructed of any material which will not be too readily attacked either by the chlorine, the molten antimony or the vaporized chlorides. To the outer end of the tube is connected a source of chlorine gas, such as a cylinder containing chlorine under pressure. The chlorine may then be forced slowly through the tube and allowed to bubble up through the molten metal.

The chlorine, while passing through the molten metal first reacts with the iron, lead, tin and certain other impurities in preference to the antimony, converting them into chlorides, being itself consumed in the process. It is desirable to so regulate the gas supply that little or no free chlorine will escape from the surface of the bath, in order to avoid wastage of the reagent as well as to prevent the corrosive chlorine fumes from attacking the apparatus.

Since these impurity metals are acted on by the chlorine in preference to the antimony they can be completely or largely converted to their chlorides before conversion of the antimony to its chloride begins to take place to any appreciable extent. As soon, however, as the conversion of the impurities to chlorides has become as complete as may be desired the flow of chlorine into the bath should be stopped. Otherwise the antimony would be attacked and itself be converted to chloride, with consequent loss of the metal. During the period in which the chlorine is caused to pass through the molten metal, the bath may be stirred, if desired.

If any of the antimony should have been reacted on by the chlorine during the treatment, the antimony chloride so formed may be separated from the impurity metal chlorides and added to another charge of impure antimony. The chlorine will leave the antimony and combine with one or more of the impurity metals, in consequence of its preference for those metals over antimony, and the antimony so freed will remain in the bath as molten metallic antimony. In fact antimony chloride may be used instead of chlorine gas in this method of purification if desired.

After the impurities have been eliminated to the desired degree and the flow of chlorine stopped the tube may be removed, and the purified antimony may be cast into bars. Before casting the metal, fluxes may be added, if desired, which will form a slag suitable for causing the surface of the cast bars to assume the characteristic "starred" appearance that is considered desirable by the trade.

The chlorides of iron, lead, tin and the other impurities commonly found in impure antimony are volatile at the temperature at which antimony melts, which is slightly below that at which the operation is preferably carried on. Consequently they rise to the surface of the bath of molten metal as soon as they are formed and escape from the retort or furnace as vapours. These vapours may be cooled until the chlorides condense, and then collected in the liquid or solid state by any suitable means, or they may be conducted to spray collectors where they may be brought into contact with sprays of water, caustic soda solution or other suitable liquid, and condensed and recovered as solution of chlorides, as basic chlorides, as their sodium salts or other compounds, as may be desired.

The condensed chlorides or other compounds of the impurity metals so collected may be subjected to further treatment to separate the various substances or to convert them into the various metals or into other marketable compounds.

Most of the impurities commonly found in impure antimony form chlorides which are volatile at the temperature of the molten metal, and are separated as hereinbefore described. But the chlorides of other impurities which may occasionally require separation are not volatile at that temperature. These chlorides will remain floating on the surface of the bath as a liquid slag or dross, which may readily be skimmed off and subjected to any further treatment that may be desired.

The herein disclosed process of purifying antimony by the action of chlorine provides a simple, economical method by which the impurities may readily be removed, leaving the antimony in a state of such high purity as to command the best market price. The method may be practiced in any suitable apparatus in which it may be possible to collect the fumes that are given off, and prevent them from escaping and endangering the health of the workmen or corroding nearby material. No expensive or complicated apparatus is required.

Also the impurities are removed in a state in which they may readily be collected by suitable means, separated, and converted to the respective metals or such useful compounds as may be desirable.

A method is provided by which lead, which has heretofore been the most troublesome impurity, may be separated as completely and easily as the other impurities.

Although we have shown and described and have pointed out in the annexed claims certain novel features of the invention, it will be understood that various omissions, substitutions and changes in the several steps of the process and in its operation may be made by those skilled in the art without departing from the spirit of the invention.

What is claimed is:

1. A method of purifying antimony which consists in heating the impure antimony to a temperature slightly above its melting point, passing a regulated stream of chlorine gas into the said molten metal until the impurity metals have been converted to chlorides, then ceasing the flow of said chlorine gas, removing the metal chlorides from the antimony, collecting said metal chlorides, separating each from the other and converting them into other forms.

2. A method of purifying antimony which consists in heating the impure antimony to a temperature above its melting point and to a temperature at which the impurity metal chlorides are volatile, passing a regulated stream of chlorine gas into the molten metal thereby to convert the impurity metals into chlorides, stopping the flow of chlorine before a substantial amount of the antimony has been attacked by the chlorine, collecting said volatilized metal chlorides separately from the antimony and treating them to recover the metals.

3. A method of purifying antimony which consists in heating the impure antimony to a temperature slightly above its melting point, passing a regulated amount of chlorine gas into the antimony while molten thereby to form chlorides of the impurity metals, but not to form substantial amounts of antimony chlorides, collecting said chlorides separately from the antimony and treating them to convert the metals into other compounds.

4. A method of purifying antimony which consists in charging the impure antimony into a retort or furnace, heating the charge until it melts, inserting below the surface of the metal bath one end of a tube of inert material, causing a regulated stream of chlorine gas to pass into said metal bath through said tube, thereby to form chlorides of the impurity metals, stopping the flow of chlorine before a substantial amount of the antimony is attacked by said chlorine and removing said tube, casting the antimony into bars, collecting said impurity metal chlorides and recovering therefrom the metals or their compounds.

5. A method of purifying antimony which consists in charging the impure antimony into a retort or furnace heating the charge until it becomes molten, inserting below the surface of the metal bath one end of a tube of inert material, causing a regulated stream of chlorine gas to pass into said metal bath through said tube, thereby to form chlorides of the impurity metals, stopping the flow of chlorine gas before a substantial amount of the antimony is attacked by said chlorine, removing said tube and separating said metal chlorides from the antimony.

6. A method of purifying antimony which consists in melting the antimony, passing a regulated stream of chlorine gas into said antimony while molten thereby to form chlorides of the impurities present in the antimony, removing the impurity metal chlorides, stopping the flow of chlorine when the impurity metals have been removed to the desired degree, collecting said chlorides and converting them to the respective metals.

7. A method of purifying antimony which consists in melting the antimony, passing into the antimony while in molten condition a regulated stream of chlorine gas thereby to form chlorides of the impurity metals, stopping the flow of chlorine before a substantial amount of the antimony has been attacked, removing the metal chlorides from the antimony, collecting said metal chlorides, and recovering therefrom the metals or their compounds.

8. A method of purifying antimony containing lead which consists in passing into said antimony while in molten condition a regulated stream of chlorine gas thereby to form chlorides of the lead and other impurities, stopping the flow of chlorine before a substantial amount of antimony has been attacked by the chlorine, removing said chlorides from the antimony and recovering the lead from said chlorides.

9. A method of purifying antimony which consists in melting the antimony, passing a regulated amount of chlorine gas into said antimony while in molten condition whereby the chlorine reacts with the impurity metals to form their chlorides, and separating said chlorides from the antimony.

10. A method of purifying antimony which consists in maintaining the antimony at a temperature slightly above its melting point, treating said molten antimony with a regulated amount of chlorine gas, thereby to form chlorides of the impurities but not to form substantial amounts of antimony chloride, and separating the chlorides from the antimony.

11. A method of purifying antimony which consists in treating said antimony while in molten condition with a quantity of antimony chloride in slight excess of the chemical equivalent in the impurity metals present thereby to convert the impurities to their respective chlorides and to convert the antimony chloride to metallic antimony, and separating said chlorides from the antimony.

12. A method of purifying antimony which consists in treating said antimony while in a molten condition with chlorine gas or antimony chloride thereby to convert the impurities to their respective chlorides, and separating said chlorides from the antimony.

Signed at New York, in the county of New York and State of New York.

CHARLES A. ROSE.

Signed at Maurer, in the county of Middlesex and State of New Jersey.

CHESTER L. READ.